(12) United States Patent
McGinty

(10) Patent No.: US 6,892,484 B2
(45) Date of Patent: May 17, 2005

(54) APPARATUS AND METHOD FOR MAMMOGRAPHY FILM IMAGE VIEWING

(76) Inventor: James J. McGinty, 465 Maltbie St. Suite 407, Lawrenceville, GA (US) 30045

( * ) Notice: Subject to any disclaimer, the term of this patent is extended or adjusted under 35 U.S.C. 154(b) by 378 days.

(21) Appl. No.: 09/976,985

(22) Filed: Oct. 15, 2001

(65) Prior Publication Data

US 2002/0050082 A1 May 2, 2002

Related U.S. Application Data

(60) Provisional application No. 60/240,573, filed on Oct. 13, 2001.

(51) Int. Cl.[7] .............................. G02B 27/02; G01B 3/14
(52) U.S. Cl. ............................... 40/361; 33/512; 33/563
(58) Field of Search ........................... 33/1 B, 474, 476, 33/512, 563; D10/71; 40/361; 428/42.1

(56) References Cited

U.S. PATENT DOCUMENTS

| | | | |
|---|---|---|---|
| 396,381 A | 1/1889 | Yaggy | |
| 2,344,823 A | 3/1944 | Landis et al. | |
| 2,344,824 A | 3/1944 | Landis et al. | |
| 3,111,582 A | 11/1963 | Levi | |
| 3,547,121 A | 12/1970 | Cherry | |
| 3,770,956 A | 11/1973 | Johnson | |
| 3,848,136 A | 11/1974 | Seldin | |
| 3,951,062 A | 4/1976 | Abramson | |
| 4,349,917 A | 9/1982 | Moore | |
| 4,394,770 A | 7/1983 | La Franca | |
| 4,580,561 A | 4/1986 | Williamson | |
| 4,630,375 A | * 12/1986 | Spolyar | 33/1 B |
| 4,838,265 A | 6/1989 | Cosman et al. | |
| 4,918,715 A | 4/1990 | Krupnick et al. | |
| 4,993,056 A | 2/1991 | Lary | |
| 5,050,200 A | 9/1991 | Tirelli et al. | |
| 5,052,035 A | 9/1991 | Krupnick | |
| 5,056,523 A | 10/1991 | Hotchkiss, Jr. et al. | |
| 5,063,583 A | 11/1991 | Galkin | |
| 5,083,305 A | 1/1992 | Tirelli et al. | |
| 5,105,457 A | 4/1992 | Glassman | |
| 5,132,996 A | 7/1992 | Moore et al. | |
| 5,174,037 A | * 12/1992 | Curtin | 33/512 |
| 5,216,700 A | 6/1993 | Cherian | |
| 5,260,985 A | 11/1993 | Mosby | |
| 5,383,234 A | 1/1995 | Russell | |
| 5,437,280 A | 8/1995 | Hussman | |
| 5,494,442 A | 2/1996 | Hecht | |
| 5,673,490 A | * 10/1997 | Hill | 33/1 G |
| 5,844,965 A | 12/1998 | Galkin | |
| 5,855,554 A | 1/1999 | Schneider et al. | |
| 5,930,327 A | 7/1999 | Lin | |
| 5,944,015 A | 8/1999 | Soble | |

\* cited by examiner

*Primary Examiner*—Cassandra Davis
(74) *Attorney, Agent, or Firm*—Myers & Kaplan, LLC; Barry E. Kaplan, Esq.

(57) ABSTRACT

An overlay device enabling evaluation of a mammography film image and a method thereof wherein a transparent overlay, graphically marked with a two-dimensional scaled grid coordinate system, is placed over and aligned with either a mediolateral oblique or craniocaudal mammography film image, thereby enabling specific and reproducible evaluation of a mammography film image by assisting in positioning evaluation by providing the identification of all structures in two planes, enabling training guidance by providing AEC centerline for symmetry evaluation, and enabling image evaluation by providing AEC sensor positions markings specific for each manufacturer's system; thus, allowing complete evaluation of positioning and imaging technique.

19 Claims, 6 Drawing Sheets

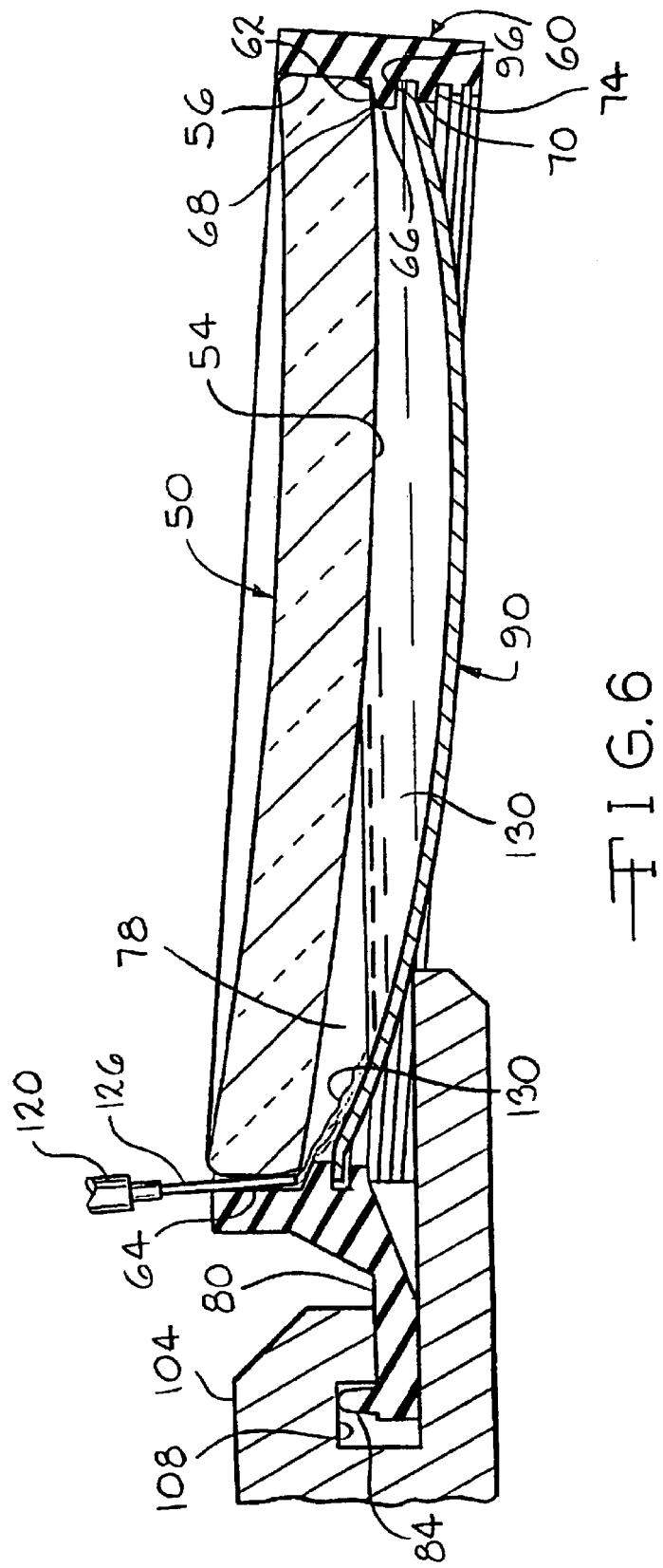

APPARATUS AND METHOD FOR MAMMOGRAPHY FILM IMAGE VIEWING

RELATED APPLICATIONS

The inventor hereof claims priority pursuant to U.S. provisional patent application Ser. No. 60/240,573 filed on Oct. 13, 2001.

TECHNICAL FIELD

The present invention relates generally to mammography films and, more specifically, to an overlay device enabling evaluation of a mammography film image and a method therefor. The present invention is particularly useful in, although not strictly limited to, applications desiring positioning evaluation, training guidance and American College of Radiology (ACR) pre-certification evaluation for mammography film images.

BACKGROUND OF THE INVENTION

Mammography images are commonly developed on x-ray film, wherein resulting mammography film images are typically viewed and interpreted on a lighted viewing box. Interpretation usually involves determination and comparison of the amount of tissue for each breast, locating and mapping the location of structural areas of interest within the breast image and recognition of potential imaging problems.

Subjective viewing and interpretation techniques do not offer standardized reference points for image evaluation, nor do they provide for quick comparison of tissue amounts. Furthermore, unassisted mammography film viewing and interpretation can limit optimum automatic exposure control (AEC), since it does not provide for AEC sensor placement evaluation.

Often, interpretation and diagnosis is assisted by the comparison of current and previous films. Accurate patient positioning and proper imaging are important for such comparisons. Perhaps more important is the ability to reproducibly pinpoint specific locations within the mammography film images.

Therefore, it is readily apparent that there is a need for an apparatus and method for mammography film image viewing wherein the use of an overlay device enables specific and reproducible evaluation of a mammography film image, thus preventing the above-discussed disadvantages.

BRIEF SUMMARY OF THE INVENTION

Briefly described, in a preferred embodiment, the present invention overcomes the above-mentioned disadvantages, and meets the recognized need for such a device, by providing a mammography film image viewing apparatus and method, wherein a transparent overlay is marked with a two-dimensional scaled grid coordinate system enabling specific and reproducible evaluation of a mammography film image.

According to its major aspects and broadly stated, the present invention is an apparatus and method for viewing a mammography film image, wherein a graphically marked transparent overlay is placed over and aligned with a mammography film image thereby assisting in positioning evaluation, training guidance and ACR evaluation.

More specifically, the present invention is a substantially transparent, substantially flat graphical overlay device, wherein the overlay is precisely calibrated to fit both mediolateral oblique (MLO) and craniocaudal (CC) view mammography x-ray films commonly known in the art. The graphic markings include a two-dimensional coordinate system and a scaled grid for reproducibly locating all imaged breast structures in two planes, an AEC center line for reproducibly marking the center of the image and AEC sensor position markings specific for each manufacturers system for identifying the position of the AEC sensor within the image.

A feature and advantage of the present invention is the ability of such a device to provide an apparatus for mammography image viewing that is simple in construction and thus easy to manufacture.

A feature and advantage of the present invention is the ability of such a method to provide a two-dimensional coordinate system and scaled grid reference for mammography images.

A feature and advantage of the present invention is the ability of such a method to provide specific and reproducible evaluation of MLO and CC view mammography film images.

A feature and advantage of the present invention is the ability of such a device to assist in breast positioning evaluation in a mammography film image.

A feature and advantage of the present invention is the ability of such a device to provide training guidance through coordinated positioning evaluation.

A feature and advantage of the present invention is the ability of such a device to assist in self-evaluation by a mammography image center prior to undergoing a required certification evaluation by the American College of Radiology (ACR).

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

Figure 1:
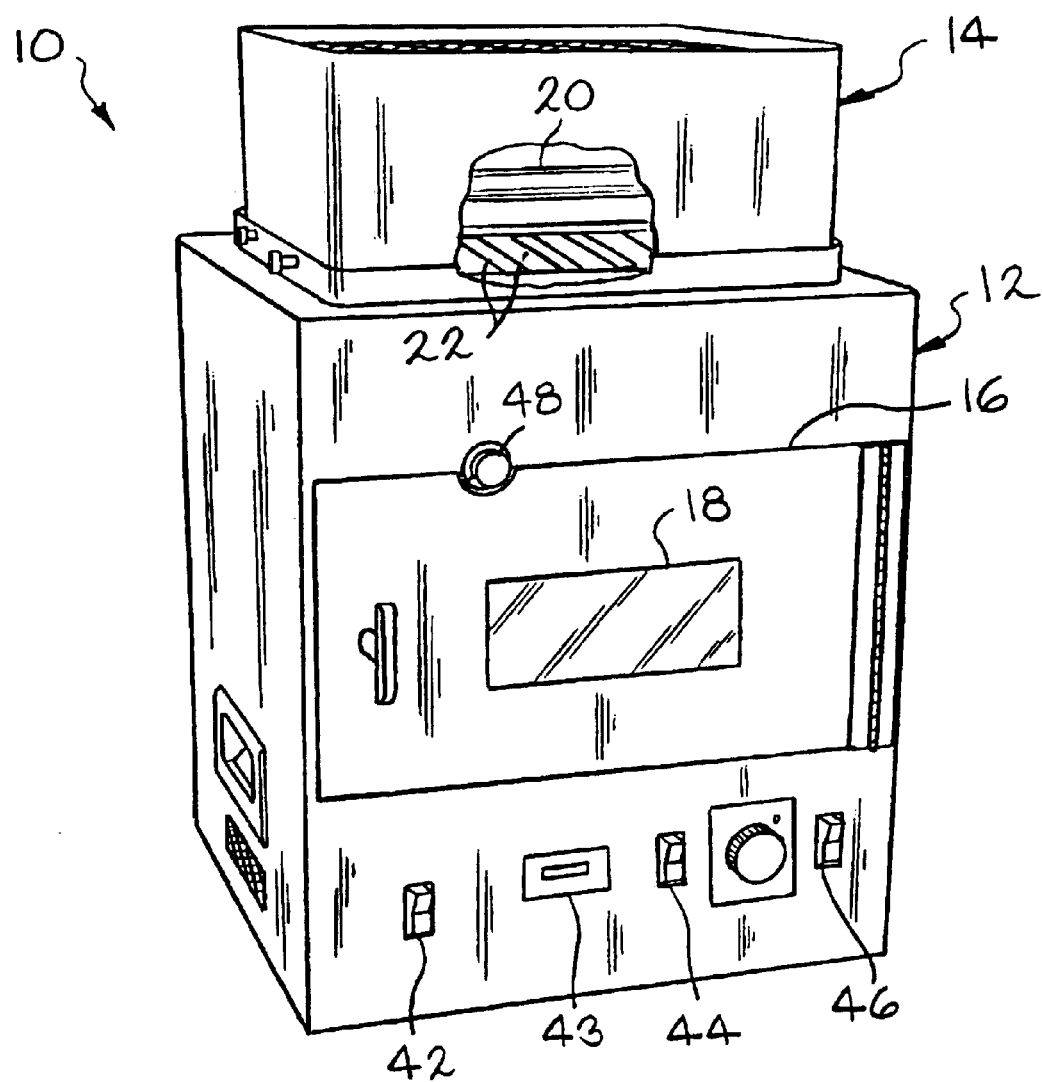
FIG. 1 is a top plan view of a mammography film image overlay device according to a preferred embodiment of the present invention showing a generic 18×24 cm left side image overlay.
Figure 2:
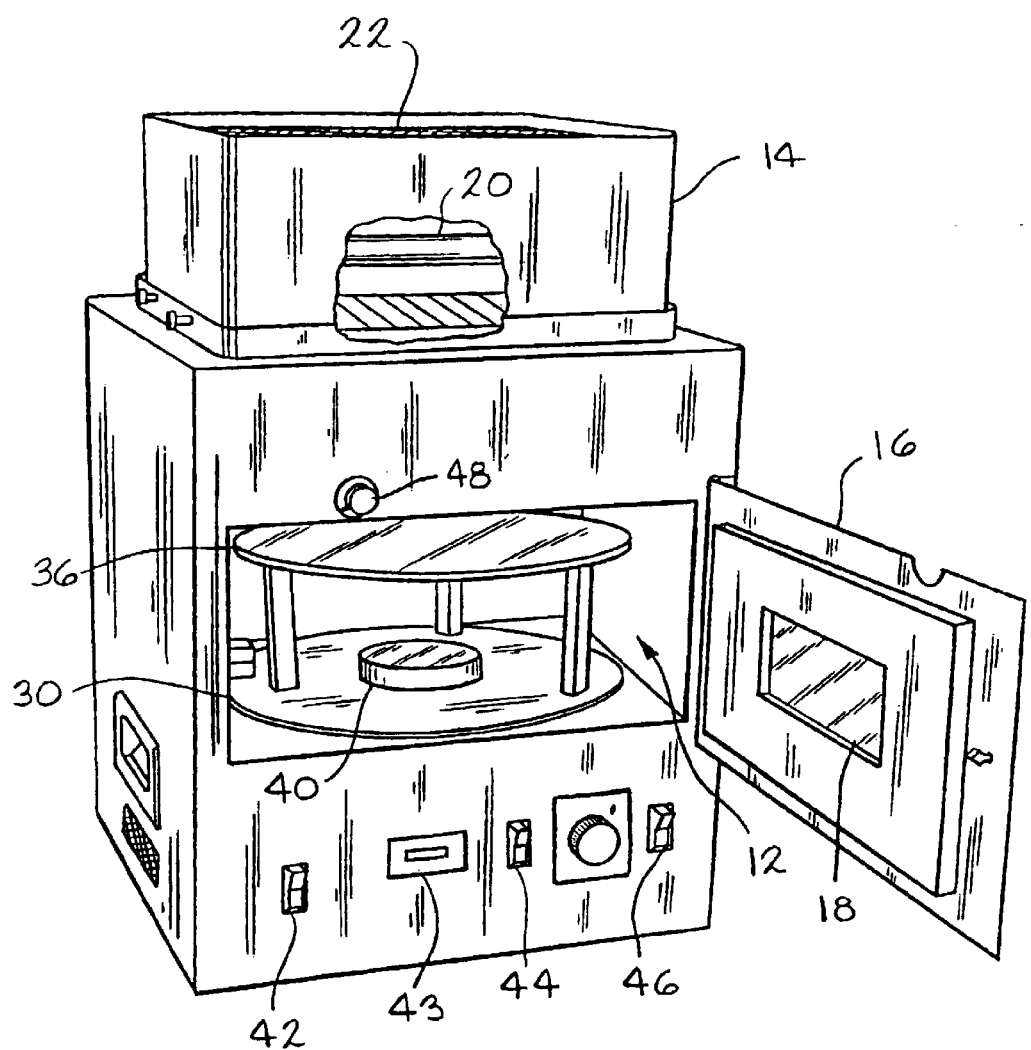
FIG. 2 is a top plan view of a mammography film image overlay device according to a preferred embodiment of the present invention showing a generic 18×24 cm right side image overlay.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE PREFERRED AND ALTERNATE EMBODIMENTS

In describing the preferred and alternate embodiments of the present invention, as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1–5, the present invention is a mammography film viewing device 10 comprising an overlay set 20, wherein overlay set 20 preferably includes first overlay 20a, second overlay 20b, third overlay 20c (not shown) and fourth overlay 20d (not shown). Each overlay 20a, 20b, 20c and 20d preferably corresponds to a specific mammograph view and film size.

Two x-ray film sizes are commonly known in the art and regularly utilized in mammography, wherein the smaller size is typically 18×24 cm and the larger size is typically 24×30 cm. First overlay 20a is preferably dimensioned to correspond with the smaller size x-ray film, preferably 18×24 cm, and is preferably utilized in the evaluation of mediolateral oblique (MLO) and craniocaudal (CC) right-side breast mammograph views. Second overlay 20b is preferably dimensioned to correspond with small size x-ray film, preferably 18×24 cm, and is utilized in the evaluation of MLO and CC left-side breast mammograph views. Third overlay 20c is preferably dimensioned to correspond with large size x-ray film, preferably 24×30 cm, and is utilized in the evaluation of MLO and CC right-side breast mammograph views. Fourth overlay 20d is preferably dimensioned to correspond with the larger size x-ray film, preferably 24×30 cm, and is preferably utilized in the evaluation of MLO and CC left-side breast mammograph views. Although, two preferred sized are described above, it should be noted that the present invention may be dimensioned to accommodate any size x-ray film.

Each overlay 20a, 20b, 20c and 20d is substantially planar, substantially rectangular shaped and is preferably formed from substantially transparent material, preferably plastic, wherein removable markings may be utilized thereon. Preferably, each plastic overlay 20a, 20b, 20c and 20d has visible markings 30 defining two-dimensional coordinate system 40, scaled grid 50, automatic exposure control (AEC) centerline 60, AEC sensor positions 70, film identification (ID) window 80, alphanumeric key reference designations 90 and proprietary name and logo designations 100.

Figure 5:
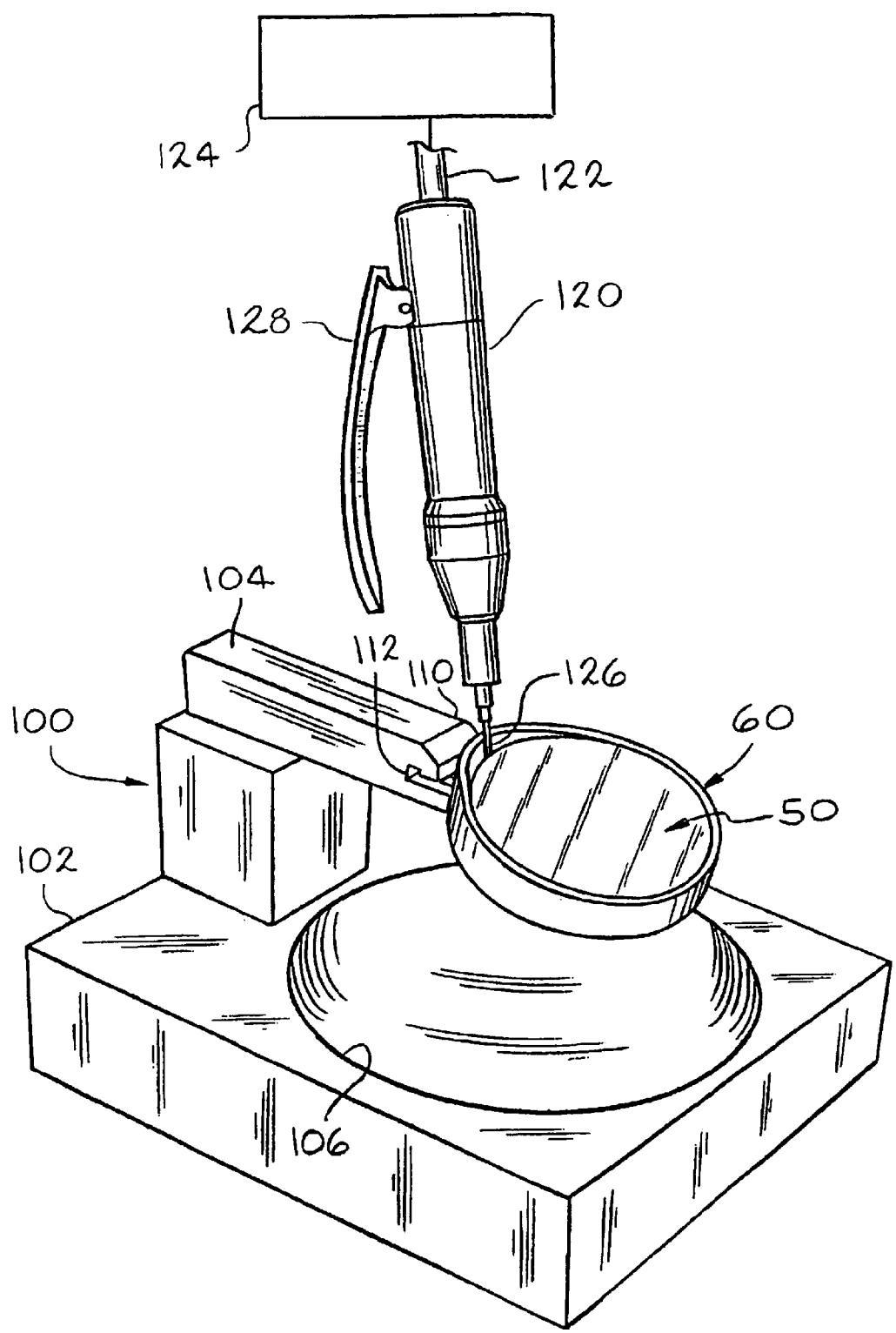
FIG. 5 is a top plan size view of a pair of mammography film image overlay devices aligned for use according to a preferred embodiment of the present invention showing a right and a left side image overlay with AEC positions for a known mammography instrument from a specific manufacturer; and, FIG. 6 is a perspective view of a mammography film image viewing device according to an alternate embodiment of the present invention showing a multi-positional ruler attached thereto.

As best seen in FIG. 5, plastic overlay 20a has front surface 22a, rear surface 24a, top edge 26a, right edge 27a, bottom edge 28a and left edge 29a. Plastic overlay 20b has front surface 22b, rear surface 24b, top edge 26b, right edge 27b, bottom edge 28b and left edge 29b. Plastic overlay 20c has front surface 22c, rear surface 24c, top edge 26c, right edge 27c, bottom edge 28c and left edge 29c. Plastic overlay 20d has front surface 22d, rear surface 24d, top edge 26d, right edge 27d, bottom edge 28d and left edge 29d.

Preferably, visible markings 30 are permanently imprinted on each front surface 22a, 22b, 22c and 22d of each plastic overlay 20a, 20b, 20c and 20d, respectively. As best seen on FIG. 2, visibly marked two-dimensional coordinate system 40 preferably includes a y-axis 42 and an x-axis 44 wherein y-axis 42 preferably has alpha reference designations 42b–42x and x-axis 44 has numeric reference designations 44a–44q.

Preferably, visibly marked alpha reference designations 42b–42x are the capitalized letters "B, C, D, E, F, G, H, I, J, K, L, M, N, 0, P, Q, R, S, T, U, V, W and X," respectively. While these capitalized letters 42b–42x are the preferred reference designations for y-axis 42, one skilled in the art would recognize that other types of reference designations could be utilized, such as, for exemplary purposes only, smaller case letters, non-English designations, universally recognized reference designations, symbols, numbers or any combination thereof wherein a unique identifier would be assigned for each reference designation 42b–42x of y-axis 42.

Preferably, visibly marked numeric reference designations 44a–44q are the numbers "1, 2, 3, 4, 5, 6, 7, 8, 9, 10, 11, 12, 13, 14, 15, 16, and 17", respectively. While these numbers 44a–44q are the preferred reference designations for x-axis 44, one skilled in the art would recognize that other types of reference designations could be utilized, such as, for exemplary purposes only, non-English designations, universally recognized reference designations, symbols, letters or any combination thereof wherein a unique identifier would be assigned for each reference point 44a–44q of x-axis 44.

Preferably, visibly marked scaled grid 50 defines a plurality of squares 52 wherein each square 52 is defined by four walls 52a, 52b, 52c and 52d wherein each wall 52a, 52b, 52c and 52d is preferably one centimeter in length. While one centimeter is the preferred length for each wall 52a, 52b, 52c and 52d of grid squares 52, one skilled in the art would recognize that other lengths could be utilized wherein the area encompassed and referenced by each square 52 of the scaled grid 50 could be smaller or larger without substantially affecting or changing the novel purpose thereof. Preferably, squares 52 of scaled grid 50 are symmetrically arranged in a plurality of rows 54a–54x wherein rows 54b–54x correspond to reference designations 42b–42x of y-axis 42, and a plurality of columns 56a–56r wherein columns 56a–56q correspond to reference designations 44a–44q of x-axis 44, as best viewed in FIG. 2. Top wall 52a of each square 52 in each row 54b–54x forms bottom wall 52c of each square 52 in each adjacent row 54a–54w, respectively. Right wall 52b of each square 52 in each column 56b–56r forms left wall 52d of each square 52 in each adjacent row 56a–56q, respectively.

Scaled grid 50 provides a method for reproducibly locating all imaged breast structures within a mammography film image and two-dimensional coordinate system 40 provides a method of designating the grid squares 52 thereby providing a method for specifically identifying imaged breast structures in two planes.

Preferably, visibly marked automatic exposure control (AEC) centerline 60 is two straight series of dashes 62a and 62b thereby defining a pair of parallel broken lines 64. Preferably, AEC centerline 60 is marked at the lateral or equatorial center 66 of scaled grid 50 wherein reference point 42m of y-axis 42 is proximate thereto. AEC centerline 60 provides a method for reproducibly locating the center 66 of a mammography film image and two-dimensional coordinate system 40 provides a method of designating AEC centerline 60 and grid squares 52 adjacent thereto, thereby providing a method for specifically identifying the symmetrical location of imaged breast structures relative to AEC centerline 60.

Figure 3:
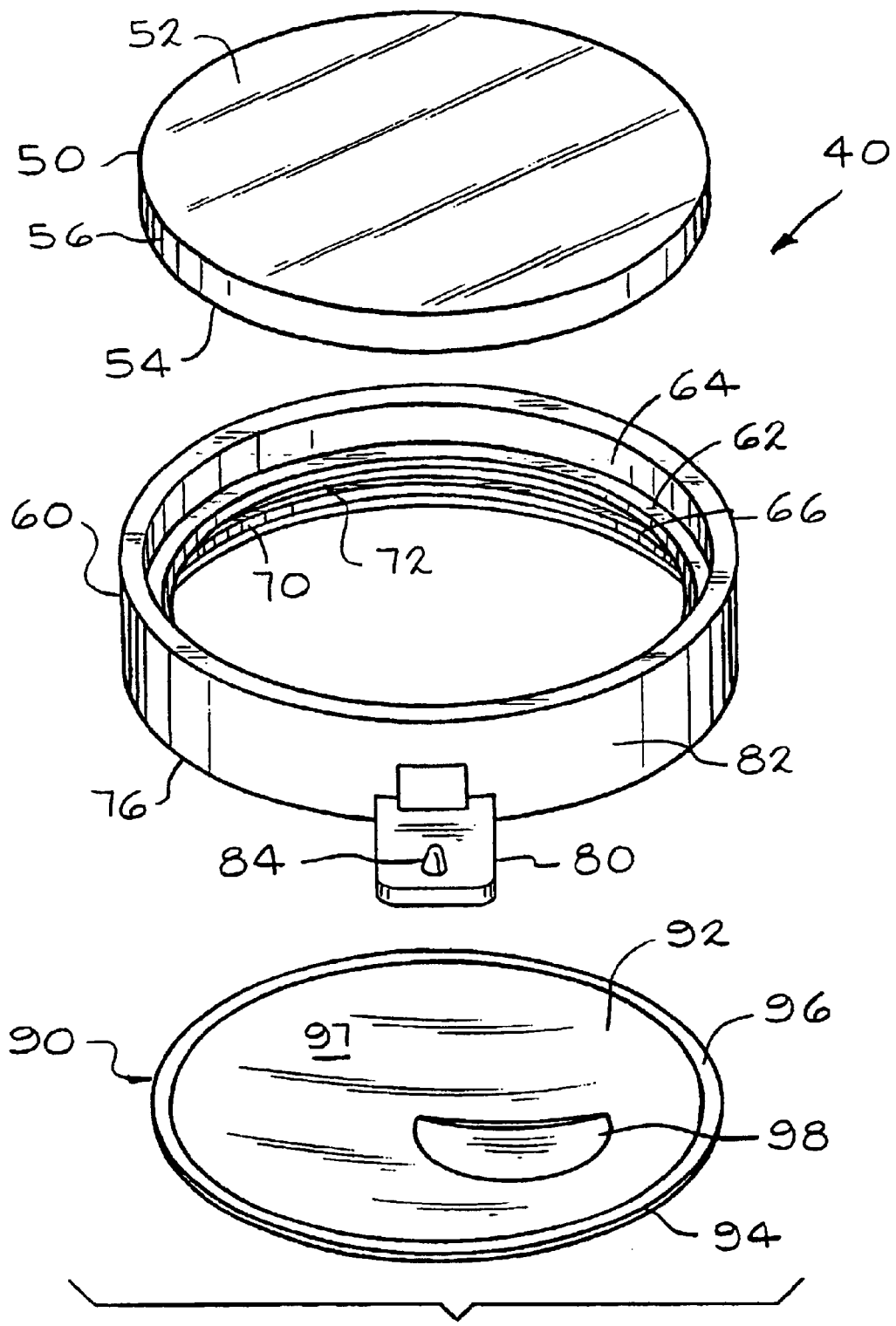
FIG. 3 is a top plan view of a mammography film image overlay device according to a preferred embodiment of the present invention showing an 18×24 cm left side image overlay with AEC positions for a known mammography instrument from a specific manufacturer.
Figure 4:
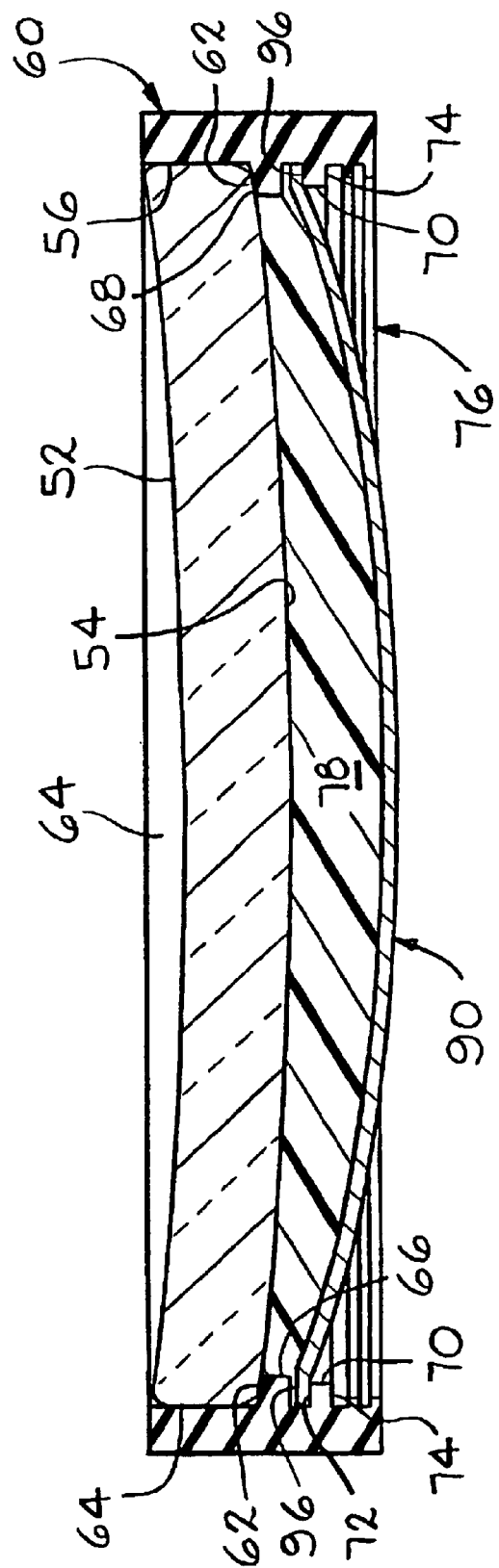
FIG. 4 is a top plan view of a mammography film image overlay device according to a preferred embodiment of the present invention showing an 18×24 cm right side image overlay with AEC positions for a known mammography instrument from a specific manufacturer.

As best seen in FIGS. 3–5, preferably visibly marked AEC sensor positions 70 are specific for each mammography manufacturer's system wherein each AEC sensor position 70 identifies each preferred location of an AEC sensor within a mammography film image when generated by a particular mammography instrument from a particular manufacturer. It will be further recognized by one ordinarily skilled in the art that AEC sensor positions 70 may be further designated by AEC sensor shapes and sizes specific for each mammography manufacturer's system. AEC sensor positions 70 are preferably defined by substantially straight line 72 having top end 72a and bottom end 72b, and substantially arcuate line 74 extending from top end 72a to bottom end 72b of straight line 72 thereby defining one longitudinal half of a substantially oval shape. Preferably, straight line 72 and arcuate line 74 are substantially solid lines for center AEC sensor position 76. Preferably, straight line 72 and arcuate line 74 are broken or dashed lines for a plurality of non-center AEC positions 76a.

Preferably, film identification (ID) window 80 is defined by first wall 80a, second wall 80b, third wall 80c and fourth wall 80d and is substantially rectangular shaped, as best seen in FIG. 5. Preferably, film ID window 80 is positioned within scaled grid 50 wherein grid squares 52 are not defined therewithin thereby creating unmarked space 82 wherein mammography film identifiers may be marked or through which mammography film identification markings may be viewed.

Preferably, visibly marked alphanumeric key reference designations 90 include image view indicator 92 and scale 94. Image view indicator 92 is preferably positioned within scaled grid 50 wherein first indicator 94 is preferably "R" thereby designating a right image view and wherein second indicator 96 is preferably "L" thereby designating a left image view. Scale 94 preferably defines a reference measurement for each square 52 of scaled grid 50. Preferably, visibly marked proprietary name and logo designation 100 is the trademark "MAMMO•GRAPH".

As best seen in FIG. 4 and FIG. 5, preferably, y-axis 42 extends longitudinally from top edge 26a and 26b of each plastic overlay 20a and 20b, respectively, wherein y-axis 42 is positioned proximate to left edge 29a and 29b of each plastic overlay 20a and 20b, respectively, thereby providing left frame 46 for two-dimensional coordinate system 40. Preferably, x-axis 44 extends horizontally from right edge 27a and 27b of each plastic overlay 20a and 20b, respectively, perpendicular to y-axis 42, wherein x-axis 44 is positioned proximate to bottom edge 28a and 28b of each plastic overlay 20a and 20b, respectively, thereby providing bottom frame 48 for two-dimensional coordinate system 40.

Preferably, alpha reference designations 42b–42x are positioned within left frame 46 between y-axis 42 and left edge 29a and 29b of each plastic overlay 20a and 20b, respectively. Preferably, numeric reference designations 44a–44q are positioned within bottom frame 48 between x-axis 44 and bottom edge 28a and 28b of each plastic overlay 20a and 20b, respectively.

Preferably, scaled grid 50 extends from y-axis 42 to right edge 27a and 27b of each plastic overlay 20a and 20b, respectively, and from x-axis 44 to top edge 26a and 26b of each plastic overlay 20a and 20b, respectively, wherein top wall 52a of each square 52 in row 54a of scaled grid 50 is positioned along top edge 26a and 26b of each plastic overlay 20a and 20b, respectively, and wherein right wall 52b of each square 52 in column 56a of scaled grid 50 is positioned along right edge 27a and 27b of each plastic overlay 20a and 20b, respectively. Preferably, visibly marked automatic exposure control (AEC) centerline 60 extends from right edge 27a and 27b of each plastic overlay 20a and 20b, respectively, to x-axis 44.

Preferably, first wall 80a of film ID window 80 positioned along top edge 26a and 26b of each plastic overlay 20a and 20b, respectively, second wall 80b of film ID window 80 is positioned within column 56o of scaled grid 50, third wall 80c of film ID window 80 is positioned along 20 bottom edge 52c of squares 52 in row 54i of scaled grid 50, wherein bottom edge 52c of row 54i is also designated as upper edge 52a of squares 52 in row 54j, and fourth wall 80d of film ID window 80 is positioned along x-axis 44 of each plastic overlay 20a and 20b.

Preferably, first image view indicator 94 is positioned proximate to film ID window 80, within scaled grid 50 on each plastic overlay 20a and 20b. Scale 94 and proprietary name and logo designation 100 are preferably positioned within bottom frame 48 on each plastic overlay 20a and 20b.

As best seen in FIG. 3 and FIG. 5, preferably, y-axis 42 extends longitudinally from top edge 26a and 26b of each plastic overlay 20a and 20b, respectively, wherein y-axis 42 is positioned proximate to right edge 27a and 27b of each plastic overlay 20a and 20b, respectively, thereby providing right frame 47 for two-dimensional coordinate system 40. Preferably, x-axis 44 extends horizontally from left edge 29a and 29b of each plastic overlay 20a and 20b, respectively, perpendicular to y-axis 42, wherein x-axis 44 is positioned proximate to bottom edge 28a and 28b of each plastic overlay 20a and 20b, respectively, thereby providing bottom frame 48 for two-dimensional coordinate system 40.

Preferably, alpha reference designations 42b–42x are positioned within right frame 47 between y-axis 42 and right edge 27a and 27b of each plastic overlay 20a and 20b, respectively. Preferably, numeric reference designations 44a–44q are positioned within bottom frame 48 between x-axis 44 and bottom edge 28a and 28b of each plastic overlay 20a and 20b, respectively.

Preferably, scaled grid 50 extends from y-axis 42 to left edge 29a and 29b of each plastic overlay 20a and 20b, respectively, and from x-axis 44 to top edge 26a and 26b of each plastic overlay 20a and 20b, respectively, wherein top wall 52a of each square 52 in row 54a of scaled grid 50 is positioned along top edge 26a and 26b of each plastic overlay 20a and 20b, respectively, and wherein left wall 52d of each square 52 in column 56a of scaled grid 50 is positioned along left edge 29a and 29b of each plastic overlay 20a and 20b, respectively. Preferably, visibly marked automatic exposure control (AEC) center line 60 extends from left edge 29a and 29b of each plastic overlay 20a and 20b, respectively, to y-axis 42.

Preferably, first wall 80a of film ID window 80 positioned along bottom edge 52c of squares 52 in row 54o of scaled grid 50, wherein bottom edge 52c of row 54o is also designated as upper edge 52a of squares 52 in row 54p, second wall 80b of film ID window 80 is positioned within along y-axis 42 of each plastic overlay 20a and 20b, third wall 80c of film ID window 80 is positioned along x-axis 44 and fourth wall 80d of film ID window 80 is positioned within column 56p of scaled grid 50 of each plastic overlay 20a and 20b.

Preferably, second image view indicator 96 is positioned in the upper-right quadrant of scaled grid 50, proximate to the intersection of row 54e and column 56m, on each plastic overlay 20a and 20b. Scale 94 and proprietary name and logo designation 100 are preferably positioned within bottom frame 48 on each plastic overlay 20a and 20b.

In an alternate embodiment, mammography film viewing device 10 could include multi-positional ruler 110, as best viewed in FIG. 6, wherein ruler 110 is preferably slidably and pivotally attached to each overlay 20a, 20b, 20c and 20d within channel 130. Ruler 110 has first end 112a, second end 112b, inner elongated carrier arm 114a, outer elongated sliding arm 114b and front surface 116. Pivot point 118 is proximate to first end 112 with inner elongated carrier arm 114a extending therefrom. Outer elongated sliding arm 114b is slidably mounted on inner elongated carrier arm 114a extending therefrom to second end 112b of ruler 110. Pivot point 118 of ruler 110 defines a protractor 120 having first straight edge 120a, second arcuate edge 120b and front surface 120c. Angle measurements 120d are visibly marked on front surface 120c of protractor 120 wherein pivotal movement of ruler 110 relative to each overlay 20a, 20b, 20c, or 20d provides a method enabling measurement of and reference to the angle achieved. Front surface 116 of outer elongated sliding arm 114b of ruler 110 is visibly marked with linear measurements 116a wherein slidable movement of outer elongated sliding arm 114b relative to inner elongated carrier arm 114a provides a method enabling measurement of and reference to the distance achieved. Channel 130 defines an elongated opening through which ruler 110 is pivotally attached. Channel 130 is positioned within left frame 46 of each overlay 20a and 20b and is positioned within right frame 47 of each overlay 20b and 20d. Elongated protrusions 132a and 132b extend from front surface 22a, 22b, 22c and 22d of each overlay 20a, 20b, 20c and 20d, respectively, and are positioned to extend outwardly for the entire length of y-axis 42 and x-axis 44, respectively, thereby forming a substantially "L" shaped lip 134 wherein a mammography film image is held thereby, against front surface 22a, 22b, 22c and 22d of each overlay 20a, 20b, 20c and 20d, respectively, for viewing thereof.

In another alternate embodiment, overlay 20a and overlay 20b could be combined and attached to form one small overlay set wherein both right and left view mammography film images would be read utilizing the combined overlay set.

In yet another alternate embodiment, overlay 20c and overlay 20d could be combined and attached to form one large overlay set wherein both right and left view mammography film images would be read utilizing the combined overlay set.

In still another alternate embodiment, at least one throughhole could be defined within overlay 20a, 20b, 20c and 20d thereby enabling a collating means to be placed therethrough to permit easily accessible hanging of the overlay set 20 proximate to a wall-mounted lighted viewing box.

In use, a full set of mammography film images is collected and developed from a patient. Depending upon the physical size characteristics of the patient, two small right views and two small left views are taken; or, alternatively, two large right views and two large left views are taken. A left view mammography film image is placed onto a lighted viewing box with a right view mammography film image placed immediately adjacent thereto wherein the right outer edge of the left view mammography film image is flush against the left outer edge of the right view mammography film image. If small size films are to be viewed, overlay 20a and overlay 20b are utilized. If large size films are to be viewed, overlay 20c and overlay 20d are utilized. Each set is utilized following the same procedure, the only difference being the proportional size thereof.

For small size films, overlay 20b is positioned on top of left view mammography film image, wherein second indicator 96 is located in the upper right quadrant thereof, and overlay 20a is positioned on top of left view mammography film image, wherein first indicator 94 is located in the upper left quadrant thereof, wherein the mammography film images are visualized therethrough. All imaged breast structures within each film are identified with reference to scaled grid 50 wherein a method for reproducibly locating such structures is utilized whereby reference to two-dimensional coordinate system 40 provides a method of designating grid squares 52 thereby specifically identifying imaged breast structures in two planes.

Symmetry of breast structures is preferably compared with reference to AEC centerline 60 whereby the center 66 of a mammography film image is easily and reproducibly located and wherein grid squares 52 adjacent thereto provide a method for specifically identifying the symmetrical location of imaged breast structures relative to AEC centerline 60. Reference to AEC sensor positions 70 preferably confirms proper placement of AEC sensors during the mammography procedure.

Film ID window 80 is visibly marked with a removable marking device wherein the visible markings provide identification for the mammography film. Scale 94 is referred to for verification of the measurement of each square 52 of scaled grid 52.

In use of an alternative embodiment wherein a multi-positional ruler 110 is provided for each overlay 20a, 20b, 20c and 20d, overlay 20a, 20b, 20c or 20d is placed on a lighted viewing box. A mammography film image of appropriately corresponding size and view is placed on front surface 22a, 22b, 22c or 22d of overlay 20a, 20b, 20c or 20d, respectively, wherein the mammography film is held in place by "L" shaped lip 134 formed by elongated protrusions 132a and 132b.

As with the preferred embodiment, all imaged breast structures within each film are identified with reference to scaled grid 50, symmetry of breast structures is compared with reference to AEC centerline 60 and proper placement of AEC sensors during the mammography procedure is confirmed with reference to AEC sensor positions 70. Also as with the preferred embodiment, film ID window 80 is visibly marked to provide identification thereof and scale 94 is referred to for verification of the measurement of each square 52 of scaled grid 52.

An additional use of the alternate embodiment, provided by multi-positional ruler 110, is the determination of angles and linear measurements throughout a mammography film image. Ruler 110 is moved vertically within channel 130 to a user-selectable position. Outer elongated sliding arm 114b is moved relative to inner elongated carrier arm 114a and is pivoted about pivot point 118 to a user-selectable position. Reference angle measurements are read from protractor 120 and reference linear measurements are read from outer elongated sliding arm 114 of ruler 110.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An image viewing device for use with a mammography film displaying an image obtained via a mammography imaging system, said image viewing device comprising:
   (a.) a substantially flat and transparent sheet;
   (b.) a scaled coordinate system visibly marked on said sheet;
   (c.) a reference centerline visibly marked on said sheet, said reference centerline comprising an automatic exposure control centerline, wherein said automatic exposure control centerline provides for reproducibly locating the center of a mammography film image and, in association with said scaled coordinate system, further provides for specifically identifying the location of imaged breast structures relative to said centerline; and
   (d.) a plurality of sensor position markings, wherein the number and placement of said sensor position markings is adapted to the specific mammography imaging system.

2. An image viewing device for use with a mammography film displaying an image obtained via a mammography imaging system, said image viewing device comprising:
   (a.) a substantially flat and transparent sheet;
   (b.) a scaled coordinate system visibly marked on said sheet; (c.) a reference centerline visibly marked on said sheet; and,
   (d.) a plurality of sensor position markings, wherein the number and placement of said sensor position markings is adapted to the specific mammography imaging system and wherein said sensor position markings comprise automatic exposure control sensor positions.

3. The image viewing device of claim 2 wherein said scaled coordinate system is selected to accommodate a film size of 18×24 centimeters.

4. The image viewing device of claim 2 wherein said scaled coordinate system is selected to accommodate a film size of 24×30 centimeters.

5. The image viewing device of claim 2 wherein said reference centerline comprises an automatic exposure control centerline.

6. The image viewing device of claim 2 wherein said automatic exposure control sensor position markings further comprise a first indicia for indication of center sensor position, and a second indicia for indication of non-center positions.

7. The image viewing device of claim 2 wherein said scaled coordinate system comprises an x-coordinate system of numerical reference designations.

8. The image viewing device of claim 2 wherein said scaled coordinate system comprises a y-coordinate system of alphabetic reference designations.

9. The image viewing device of claim 2 further comprising a scale for defining a reference measurement for said coordinate system.

10. An image viewing device for use with a mammography film displaying an image obtained via a mammography imaging system, said image viewing device comprising:
    (a.) a substantially flat and transparent sheet;
    (b.) a scaled coordinate system visibly marked on said sheet;
    (c.) a reference centerline visibly marked on said sheet;
    (d.) a plurality of sensor position markings, wherein the number and placement of said sensor position markings is adapted to the specific mammography imaging system; and
    (e.) an image view indicator for differentiating between a right image view and a left image view.

11. An image viewing device for use with a mammography film displaying an image obtained via a mammography imaging system, said image viewing device comprising:
    (a.) a substantially flat and transparent sheet;
    (b.) a scaled coordinate system visibly marked on said sheet;
    (c.) a reference centerline visibly marked on said sheet;
    (d.) a plurality of sensor position markings, wherein the number and placement of said sensor position markings is adapted to the specific mammography imaging system; and
    (e.) a multi-positional measurement means.

12. The image viewing device of claim 11 wherein said measurement means comprises a linear measurement indicator that is slidably, pivotally, and cooperatively engaged with said sheet.

13. The image viewing device of claim 12 wherein said measurement means further comprises an angular measurement indicator.

14. An image viewing device for use with a mammography film displaying an image obtained via a mammography imaging system, said image viewing-device comprising:
    (a.) a substantially flat and transparent sheet, wherein said sheet accommodates both a right image view and a left image view;
    (b.) a scaled coordinate system visibly marked on said sheet;
    (c.) a reference centerline visibly marked on said sheet; and,
    (d.) a plurality of sensor position markings, wherein the number and placement of said sensor position markings is adapted to the specific mammography imaging system.

15. An image viewing device for use with a mammography film displaying an image of an internal breast structure, said image viewing device comprising:
    (a.) a substantially flat and transparent sheet having a front surface;
    (b.) a scaled coordinate system visibly marked on said front surface of said sheet;
    (c.) an automatic exposure control centerline visibly marked on said front surface of said sheet;
    (d.) a plurality of automatic exposure control sensor position markings, wherein the number and placement of said sensor position marking is specific for a mammography imaging system; and,
    (e.) an image view indicator for differentiating between a right image view and a left image view.

16. A process for viewing a previously exposed and developed mammography film with an image thereon, said process comprising the step of:
    (a.) obtaining a mammography film image viewing device having a transparent overlay marked with a two-dimensional scaled grid and coordinate system, an automatic exposure control centerline, and automatic exposure control sensor positions;

(b.) placing said overlay over an appropriately sized mammography film image of an appropriate view, and aligning said overlay therewith; and, (c.) evaluating and repoducibly referencing the positioning of a pre-imaged breast structure in two-planes.

17. The process of claim 16 further comprising the step of comparing said imaged breast structure to said centerline and said sensor positions in order to confirm proper placement of said sensors during an imaging procedure.

18. The process of claim 16 wherein said step (c.) further includes the step of obtaining and using a multi-positional measurement means for referencing the position of said breast structure.

19. The process of claim 18 wherein said multi-positional measurement means comprises a ruler and a protractor to determine angular and linear reference measurement of said pre-imaged breast structure.

* * * * *